United States Patent
Pica

(10) Patent No.: US 12,460,728 B2
(45) Date of Patent: Nov. 4, 2025

(54) EXPANDABLE SEAL FOR PASSENGER LOADING BRIDGES

(71) Applicant: Bret Pica, Denver, CO (US)

(72) Inventor: Bret Pica, Denver, CO (US)

( * ) Notice: Subject to any disclaimer, the term of this patent is extended or adjusted under 35 U.S.C. 154(b) by 805 days.

(21) Appl. No.: 17/847,177

(22) Filed: Jun. 23, 2022

(65) Prior Publication Data

US 2023/0417327 A1    Dec. 28, 2023

(51) Int. Cl.
*B64F 1/305*    (2006.01)
*F16J 15/46*    (2006.01)

(52) U.S. Cl.
CPC .............. *F16J 15/46* (2013.01); *B64F 1/305* (2013.01)

(58) Field of Classification Search
CPC .................................. B64F 1/305; F16J 15/46
USPC .......................................................... 14/71.5
See application file for complete search history.

(56) References Cited

U.S. PATENT DOCUMENTS

| | | |
|---|---|---|
| 2,648,554 A | 8/1953 | Gilbert |
| 2,822,192 A | 2/1958 | Beatty |
| 3,110,048 A | 11/1963 | Bolton |
| 3,184,772 A | 5/1965 | Carvel |
| 3,263,254 A | 8/1966 | Wollard et al. |
| 3,412,412 A | 11/1968 | Nerulf et al. |
| 3,951,684 A | 4/1976 | LaPrad |
| 4,180,272 A | 12/1979 | Heitz |
| 4,333,194 A | 6/1982 | Drozd |
| 5,893,567 A | 4/1999 | Bitterli |
| 6,055,692 A | 5/2000 | Pell et al. |
| 6,487,742 B1 | 12/2002 | Beazer et al. |
| 7,269,871 B2 | 9/2007 | Koch et al. |
| 2003/0145399 A1 | 8/2003 | Smith et al. |

FOREIGN PATENT DOCUMENTS

| | | |
|---|---|---|
| CA | 660225 A | 3/1963 |
| DE | 916250 C | 8/1954 |
| DE | 3930871 A1 | 3/1990 |
| EP | 0205314 A1 | 12/1986 |

OTHER PUBLICATIONS

International Search Report and Written Opinion received for International Patent Application No. PCT/US2023/069014, mailed on Oct. 10, 2023, 09 pages.

*Primary Examiner* — Raymond W Addie
(74) *Attorney, Agent, or Firm* — Michael Henson; Maynard Nexsen PC

(57) ABSTRACT

The telescoping joints (110,114) of an articulating aircraft passenger boarding bridge are sealed airtight by an expandable seal (202) in the overlapping and concentric portion between the outer circumference of an internal structure (106) and the interior circumference of an external structure (108). The preferred embodiment is an inflatable bladder (202) with an air outlet (412) and an air inlet (406) to accept compressed air. The bladder (202) expands to seal the gap between the concentric structures when the telescoping structures are immobilized and deflate to allow movement of the telescoping structures. The embodiment may be comprised of a plurality of expandable seals geometrically shaped to form a whole seal.

13 Claims, 1 Drawing Sheet

EXPANDABLE SEAL FOR PASSENGER LOADING BRIDGES

FIELD OF THE INVENTION

An embodiment relates to the field of aircraft passenger boarding bridges, specifically to seals of occupiable telescoping loading bridge structures.

BACKGROUND—PRIOR ART

Foreign Patent Documents

| Foreign Doc. Nr. | Cntry Code | Kind Code | Pub. Date | Inventor |
|---|---|---|---|---|
| 3930871 | DE | A1 | 1990 Mar. 22 | Piduch et al. |
| 0205314 | EP | A1 | 1986 Dec. 17 | Wenham et al. |

BACKGROUND

Passenger loading bridges are well known and are used at airports to load and unload passengers between concourses and parked aircraft. Loading bridges are used to protect passengers and aircraft interiors from inclement weather including rain, snow, hail, wind, and sun. Loading bridges have empirically been considered external to concourse building envelopes. As such the envelope separating the interior of the loading bridge from the exterior atmosphere has generally not been required to be sealed to building envelope standards. Additionally, in the event of an emergency such as an auxiliary power unit fire or ramp fuel fire the preferred egress path from an aircraft connected to a concourse by a loading bridge is through the loading bridge into the concourse.

However, the use of concourse gate doors opening to the passenger loading bridges differs substantially from ordinary buildings. There may be a up to sixty or eighty gates in a single concourse and each gate door may be open a substantial portion of a given day as passengers board and deplane the aircraft. For example, a narrow body passenger aircraft may spend 50 minutes boarding and 25 minutes deplaning during a cycle or turn. Based on these estimates and with 6 arrivals and departures per day a concourse gate door to a loading bridge may be open approximately 7.5 hours per day. The length of time the gate doors are open may vary significantly on a given day subject to the type of aircraft at the gate, number of aircraft arrivals and departures at each gate, number of passengers on the aircraft, and other factors. Elements of this example such as times, number of gates, and number of arrival and departures are provided for illustrative purposes and will vary widely from airport to airport and concourse to concourse.

Field observations and unpublished studies indicate that airport passenger loading bridges are poorly sealed when subjected to moderate atmospheric wind speeds. It was routinely found that substantial airflows were introduced to concourses. Substantial airflows from loading bridges into concourses were observed during moderate wind conditions. These airflows came from multiple areas in the loading bridges including the aircraft to loading bridge seal, rotating joints, telescoping structure joints, and exterior envelope construction. New passenger loading bridges were found to have similar air leakage rates as decades old loading bridges.

Poorly constructed loading bridges may allow the introduction of substantial amounts of unconditioned air into concourses. When many loading bridges are connected to a concourse each loading bridge is a part of and contributes to system of air movement. For instance, the air pressures encountered by a loading bridge on one side of a concourse may induce an airflow into a concourse from a loading bridge on the other side essentially inducing crossflow through a concourse. These uncontrolled air flows impart significant heating and cooling demands on the concourse environmental systems. Given that many airports have tens if not hundreds of loading bridges there are substantial implications for energy consumption, energy cost, passenger comfort, and carbon footprint which could be mitigated by improved loading bridge construction.

The construction forming the shell or envelope of a typical passenger loading bridge is complex. A loading bridge has a multiplicity of degrees of freedom and given the occupiable nature of the loading bridge much of the envelope construction is integral to loading bridge articulation. Loading bridge structures may be comprised of fixed structures, telescoping structures, rotatable structures, leveling apparatus, and elevational apparatus. As such many different types of seals may be required to adequately seal loading bridges.

The following prior art was found relevant to this application:

Wenham in EP0205314A1 describes a method of axially inflatable seals to join abutting elements which does not address sealing concentric and telescoping structures which is the predominant design in use.

Piduch et al. in DE3930871A1 describes a seal similar to this application, but it's use is for sealing telescoping ducts charging coal into a coking oven, not occupiable telescoping structures.

SUMMARY OF THE INVENTION

It is an object of this invention to provide improved weather seals at the overlapping joints of concentric telescoping structures of passenger loading bridges.

It is a further object of this invention to provide expandable and retractable weather seals allowing the telescoping structures of a passenger loading bridge to move freely while positioning the loading bridge.

The present invention achieves these objectives by preferably incorporating expandable seals around the outer circumference of an inner telescoping passenger loading bridge structure and inside circumference of an outer telescoping structure which comprise a joint of two passenger loading bridge structures. The preferred embodiments of the present invention will provide a substantially airtight joint between telescoping structures.

BRIEF DESCRIPTION OF THE DRAWINGS

The accompanying drawings illustrate the present aircraft passenger boarding bridge telescoping seals and are a part of the specification. Together with the following description, the drawings demonstrate and explain the principles of the several embodiments of which.

DETAILED DESCRIPTION OF THE PREFERRED EMBODIMENTS OF THE INVENTION

Figure 1:
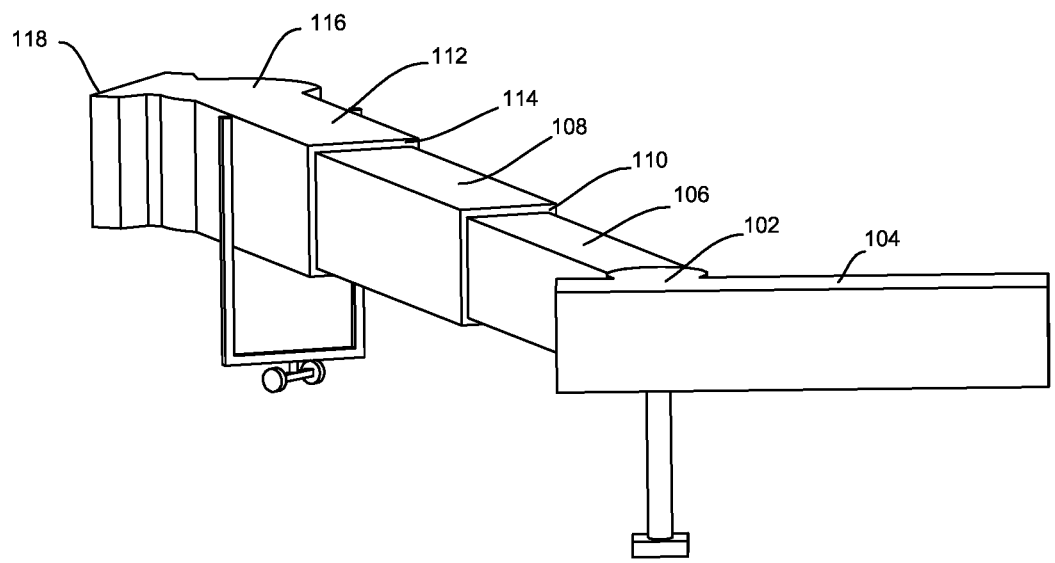
FIG. 1 is an isometric view of a typical passenger loading bridge to describe location and operation of the present invention.

In the following detailed description, reference is made to the accompanying drawings which form a part hereof, and in which is shown, by way of illustration, specific ways which embodiments may be practiced. In the drawings, like numerals describe substantially similar components throughout the several views. These embodiments are described in sufficient detail to enable those skilled in the art to practice various embodiments. Other embodiments may be utilized and structural, logical, and layout changes may be made without departing from the scope of the various embodiments.

FIG. 1 illustrates a typical articulating passenger loading bridge to orient the reader. A rotunda 102 is attached to a building or fixed loading bridge structure 104 and allows rotation of a first structure 106. A second structure 108 is circumferentially larger in cross section than structure 106 and slides in a telescoping manner over structure 106. This forms an overlapping and concentric joint 110. Joint 110 extends from overlapping end of structure 106 inside structure 108 to the exterior end of 108. A passenger loading bridge may have a plurality of successive telescoping structures and joints such as structure 112 larger in cross section than 108 and sliding over structure 108 comprising joint 114, which is similar to joint 110. Three concentric structures and two joints are shown and should not interpreted as limiting the application of the present invention where two concentric structures and one joint or multiple additional and structure joints could be provided. Structure 112 is attached to cab 116 which also rotates to dock with an aircraft or vehicle at loading bridge terminus 118 which is typically comprised of a bellowed awning. Cab 116 and terminus 118 are not fully detailed and are only meant to illustrate the entirety of the loading bridge assembly.

Figure 2:
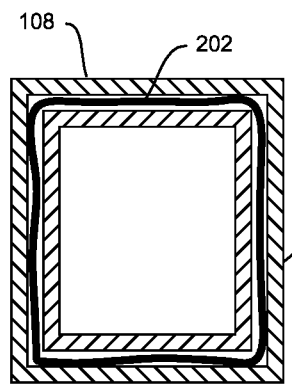
FIG. 2 is a lateral cross section through a joint of two overlapping structures of a passenger loading bridge

FIG. 2 illustrates an embodiment through lateral section through structure 108 and overlapping structure 108 at joint 110. Inflatable bladder 202 is shown in a deflated state between structures 106 and 108. When expanded, seal 202 fills the void between structure 106 and structure 108 to substantially contact the inner surface of structure 108 and the exterior surface of structure 106. The embodiment at joint 114 where structure 112 overlaps structure 108 is similar and congruent to joint 110.

Figure 3:
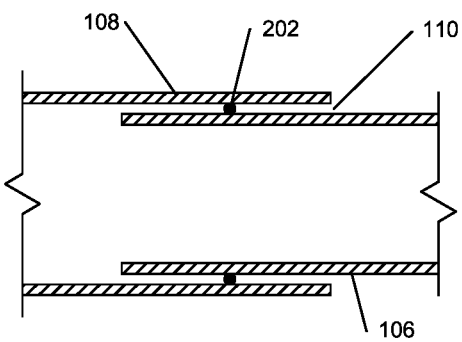
FIG. 3 is a longitudinal cross section through a joint of two overlapping structures of a passenger loading

FIG. 3 is a longitudinal section of the embodiment through joint 110 and illustrates the placement of inflatable bladder 202 between structures 106 and 108. Inflatable bladder 202 is shown in an inflated state in this section and illustrates contact with structure 106 and structure 108 thereby forming a substantially airtight seal. The embodiment at joint 114 where structure 112 overlaps structure 108 is similar and congruent to joint 110.

Figure 4:
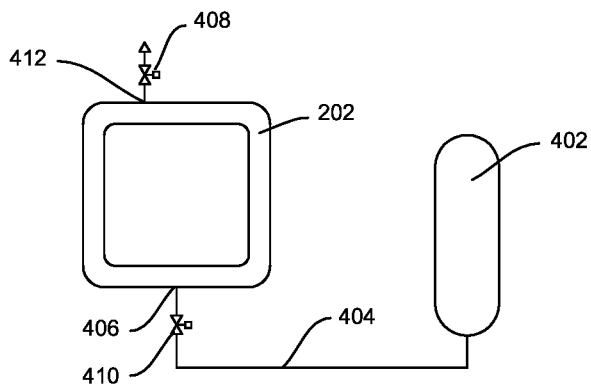
FIG. 4 is a schematic of a compressed air system to inflate and deflate said bladder

FIG. 4 is a schematic of an embodiment illustrating a compressed air system by which expandable seal 202 is comprised of an inflatable bladder. Compressed air source 402 feeds bladder 202 through compressed air line 404 and inlet 406. When bladder 202 is desired to be inflated motorized air relief valve 408 closes to atmosphere and compressed air inlet valve 410 opens allowing compressed air to inflate the bladder seal. When the bladder is desired to be deflated air inlet valve 410 closes and air relief valve 408 opens allowing compressed air to vent to atmosphere through bladder outlet 412. Said compressed air source 402 and compressed air line 404 may serve a multiplicity of inflatable bladders and passenger loading bridges. Bladders and valves may be combined in myriad configurations such as to allow multiple bladders to inflate from one valve. This illustration should not be construed to limit the scope of the invention and is shown in a simple and preferable installation for illustration. Myriad ways of piping and connecting valves are routine and are known to those skilled in the art.

Figure 5:
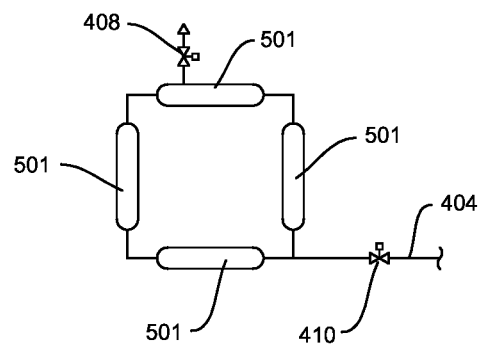
FIG. 5 is a schematic illustrating the use of multiple bladders to comprise a complete seal.

FIG. 5 is a schematic illustration of the preferred embodiment where multiple bladders 501 may be used to fulfill the function of a single bladder 202 where the system of bladders 501 provides the functionality of a single bladder 202 and is the preferred embodiment to accommodate various geometries and appurtenances at each joint 110, 114. The single air inlet valve 410 and single air relief valve 408 shown in the drawing figure shall not limit the scope of the invention as myriad valves and bladders and combinations thereof may be employed as well as serial and parallel compressed air piping 404 systems and are known to those skilled in the art. The bladders may be preferably preformed to match the geometry of the particular joints and locations where installed.

Figure 6:
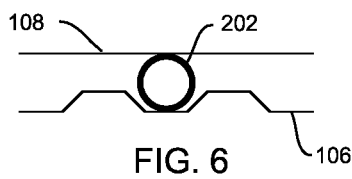
FIG. 6 is a cross section showing a seal in the cavity the exterior channeled sheet metal skin on an interior structure and the smooth interior of an overlapping structure.

FIG. 6 illustrates a preferred embodiment where section through the exterior channeled skin of interior structure 106 overlapped by the smooth interior of structure 108. Seal 202 is advantageously positioned in the concave portion of the interior structure 106 exterior skin to form a more robust seal.

Operation—FIGS. 1,2,3,4

Compressed air seals are inflated when the passenger loading bridge gate door is open to extend the building envelope. When repositioning of the loading bridge is required seal 202 is deflated by closing compressed air inlet valve 410 and opening air relief valve 408. The overlapping sliding structures 106 and 108 are then freely moveable. The loading bridge can then be repositioned. When loading bridge positioning is complete relief air valve 408 is closed, and compressed air valve 410 is opened thereby inflating seal 202 thereby providing an air tight seal at joint 110.

In another embodiments passenger loading bridges with smooth exterior skins could use a solid O ring type seal to slide between the two structures, but atmospheric damage to the skin from weather phenomena such as hail or grit could interfere with seal effectiveness therefore an expandable seal is seen as the preferred embodiment.

The preceding description has been presented only to illustrate and describe disclosed embodiments. It is not intended to be exhaustive or to limit the embodiment to any precise form disclosed. Many modifications and variations are possible in light of the above teaching.

I claim:

1. An expandable joint seal in a passenger loading bridge which connects a building to a vehicle, comprising:
   a joint comprising overlapping structures;
   an expandable seal for filling a void between said overlapping structures, said expandable seal comprising:
   at least one inflatable bladder adapted to be situated in a deflated state within the void, said at least one inflatable bladder having an air inlet;

an air inlet valve for controlling flow of air through the air inlet;
a compressed air source;
at least one compressed air line interposed between the compressed air source and the air inlet; and
a motorized air relief valve associated with said expandable joint seal, wherein:
closing said motorized air relief valve and opening said air inlet valve allows said compressed air source to feed air into said inflatable bladder through said compressed air line to inflate said bladder and provide a substantially airtight seal between the overlapping structures.

2. The expandable joint seal of claim 1 comprising a plurality of inflatable bladders situated within the void.

3. The expandable joint seal of claim 1 comprising a plurality of inflatable bladders each having an associated said air inlet valve and motorized air relief valve and each adapted to be situated in a deflated state between said overlapping structures, said compressed air source and said at least one compressed air line feeding each of said inflatable bladders.

4. The expandable joint seal of claim 1 wherein said expandable joint seal is situated in a concave channel of an exterior skin of an inner one of said overlapping structures.

5. The expandable joint seal of claim 1 wherein said overlapping structures are overlapping telescopic structures.

6. An expandable seal for filling a void between overlapping structures of a passenger loading bridge, comprising:
at least one bladder adapted to be situated in a deflated state within the void, said inflatable bladder having an air inlet;
an air inlet valve for controlling flow of air through the air inlet;
a compressed air source;
a compressed air line interposed between the compressed air source and the air inlet; and
a motorized air relief valve associated with said expandable seal, wherein:
closing said motorized air relief valve and opening said air inlet valve allows said compressed air source to feed air into said inflatable bladder through said compressed air line to inflate said bladder and provide a substantially airtight seal between the overlapping structures.

7. The expandable seal of claim 6 comprising a plurality of inflatable bladders adapted to be situated within the void.

8. The expandable seal of claim 6 comprising a plurality of inflatable bladders each having an associated said air inlet valve and motorized air relief valve and each adapted to be situated in a deflated state between the overlapping structures, said compressed air source and said at least one compressed air line feeding each of said inflatable bladders.

9. The expandable seal of claim 6 wherein said overlapping structures are overlapping telescopic structures.

10. A method of sealing a void that exists in a joint between overlapping structures of a passenger loading bridge which connects a building to a vehicle, comprising:
situating an expandable seal in the void, said expandable seal comprising at least one inflatable bladder having an air inlet;
feeding compressed air into said at least one inflatable bladder from a compressed air source to transition said at least one inflatable bladder from a deflated state to an expanded state whereby said at least one inflatable bladder provides a substantially airtight seal at said joint.

11. The method of claim 10 further comprising providing a motorized air relief valve and an air inlet valve associated with said expandable seal.

12. The method of claim 10 further comprising closing said motorized air relief valve and opening said air inlet valve prior to activating said compressed air source.

13. The method of claim 10 wherein said method is for sealing a void that exists in a joint between two overlapping telescopic structures.

\* \* \* \* \*